K. TSUBOI.
GARDEN IMPLEMENT.
APPLICATION FILED JULY 5, 1913.
1,109,487.
Patented Sept. 1, 1914.
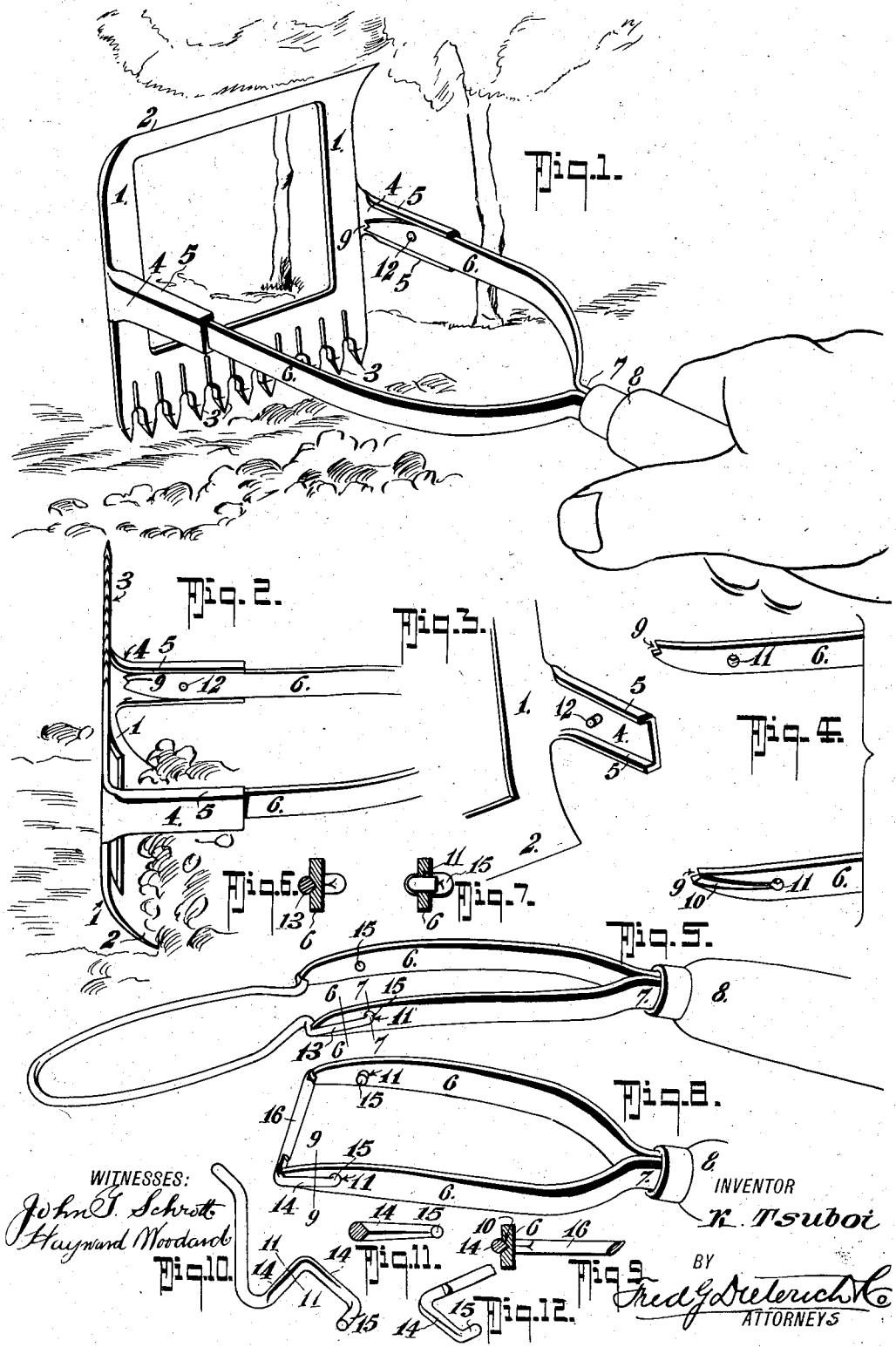
WITNESSES:
John T. Schrott
Hayward Woodard
INVENTOR
K. Tsuboi
BY
Fred G. Dieterich
ATTORNEYS

UNITED STATES PATENT OFFICE.

KAYOZI TSUBOI, OF PORTLAND, OREGON.

GARDEN IMPLEMENT.

1,109,487.

Specification of Letters Patent.  Patented Sept. 1, 1914.

Application filed July 5, 1913. Serial No. 777,510.

*To all whom it may concern:*

Be it known that I, KAYOZI TSUBOI, residing at Portland, in the county of Multnomah and State of Oregon, have invented certain new and useful Improvements in Garden Implements, of which the following is a specification.

My present invention has relation to garden implements and it is more particularly designed for providing a simple and inexpensive garden hoe of that class having a pronged edge and a cutting edge.

Among other objects, my present invention seeks to provide certain improvements in garden implements in which is included an inexpensive and easily manipulated means for holding the rake, cutter or other body head member in interlockable engagement with the handle.

My present invention comprehends a new and improved garden implement in which is embodied the peculiar and novel arrangement of parts, all of which will be hereinafter first described, pointed out in the appended claims and illustrated in the accompanying drawings, in which:

Figure 1 is a perspective view of my invention, the body portion thereof being arranged as a "scraper". Fig. 2 is a detail perspective view of the head portion thereof, the same being shown as a cutting implement. Figs. 3 and 4 are detail views of parts hereinafter specifically referred to. Fig. 5 is a perspective view of a slightly modified form of my invention. Figs. 6 and 7 are detail cross sections taken on the line 6—6 and 7—7 on Fig. 5. Fig. 8 is a perspective view of a further modification of my invention. Fig. 9 is a cross section thereof on the line 9—9 of Fig. 8. Fig. 10 is a detail perspective of one end of the wire member shown in Fig. 5. Fig. 11 is a section on line 11—11 on Fig. 10. Fig. 12 is a detail perspective of one of the wire members shown in Fig. 8.

In the practical application of my invention, the same embodies a head or body portion, a handle and a means for detachably interlocking the head portion with the handle, and the provision of such form of interlocking means whereby the same handle member may be utilized for holding different kinds of head or body portions.

In the preferred arrangement of my invention, as shown, (see Figs. 1, 2 and 3) the head or body portion of the implement is in the nature of a rectangular frame 1, one edge of which is turned inwardly and tapered to form a chopping or hacking blade 2, and the opposite edge is formed with rake-like teeth 3. At the opposite ends, the body 1 has integral inwardly extending side arms 4, the upper and lower edges of which are bent inwardly to form horizontal flanges 5 to thereby provide a grooved way for the reception of the side arms 6 of the handle which consists of the spring metal body, that includes the side arms 6, the tang 7 and the handle proper 8. The outer end of each of the side arms 6 has a V-shaped notch 9 that communicates with a V-shaped groove 10 that extends along the outer face of the arm and terminates at an aperture 11.

When used as in Figs. 1 and 2, the side arms are bent inwardly and sprung into the grooved faces of the side arms of the frame 1, the latter each having an inwardly projected stud 12 for fitting into the apertures 11 in the said side arms, as shown.

In Fig. 5, the body portion is in the nature of a beater formed of a single strand of heavy spring wire bent into a loop, the ends being formed with lateral portions 13, V-shaped in cross section (see Fig. 6) to seat into the V-shaped notches of the side arms 6 of the handle.

The ends of the loop-like body, shown in Fig. 5, or the straight cross member 16, shown in the modified form Fig. 8, include parallel clamping members 14 also V-shaped in cross section so as to snugly fit the V-shaped grooves in the arms 6—6 and the said members 14 terminate in inturned fingers 15 for fitting into the apertures 11 in the said side arms 6.

By forming the wire members, as shown in Figs. 5 and 8, the side arms 6 can be readily interlocked with the said wire members to hold them in a fixed relation with the said side arms.

The members 13 and 16 may be used for any desirous purpose, such as breaking clods, beating down grass, or for any other purpose desired.

From the foregoing taken in connection with the drawings, the complete construction, the manner in which the several parts may be assembled and the advantages of my invention will be readily apparent.

What I claim is:

1. A garden implement comprising a handle including a pair of opposite resilient side arms, each having an aperture and a longitudinal groove on the outer face that extends from the apertures to the end of the arm, and a tool including side fingers each of which has a portion for engaging the aperture in its respective side arm, and another portion for engaging the grooves in their said respective side arms.

2. A garden implement comprising a handle including a pair of opposite resilient side arms, each having an aperture near its outer end, a groove in the outer face thereof that extends from the aperture to the outer end of the arm, the said outer end having a notch, and a tool, the said tool including side fingers for seating in the grooves of the side arms, the ends of the said fingers terminating in inturned members for engaging the apertures in the side arms, said tool also including portions for seating in the notches in the ends of the side arms.

3. A garden implement which comprises two implement members, one of which consists of a handle including a pair of resilient side arms having a circular aperture in each near the outer ends of the same, the other of said implement members comprising a tool that includes opposing side fingers, pins carried by said side fingers to enter said apertures, and means for holding said arms, and fingers in alinement from turning on said pins, said means comprising the provision of one of said implement members with grooves into which the opposing parts of the other of said implement members lie, substantially as shown and described.

KAYOZI TSUBOI.

Witnesses:
W. J. MAKELIM,
I. S. ARMSTRONG.